United States Patent
Ueno et al.

(10) Patent No.: US 9,644,881 B2
(45) Date of Patent: May 9, 2017

(54) REFRIGERATION DEVICE FOR CONTAINER

(71) Applicant: DAIKIN INDUSTRIES, LTD., Osaka-shi, Osaka (JP)

(72) Inventors: Akitoshi Ueno, Osaka (JP); Yuusuke Fujimoto, Osaka (JP); Hideaki Kuriyama, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 23 days.

(21) Appl. No.: 14/417,437

(22) PCT Filed: Jul. 23, 2013

(86) PCT No.: PCT/JP2013/004468
§ 371 (c)(1),
(2) Date: Jan. 26, 2015

(87) PCT Pub. No.: WO2014/020857
PCT Pub. Date: Feb. 6, 2014

(65) Prior Publication Data
US 2015/0192343 A1    Jul. 9, 2015

(30) Foreign Application Priority Data
Jul. 31, 2012  (JP) .................................. 2012-170292

(51) Int. Cl.
*F25D 17/06*  (2006.01)
*F25D 11/00*  (2006.01)
(Continued)

(52) U.S. Cl.
CPC .............. *F25D 11/003* (2013.01); *F25B 1/00* (2013.01); *F25B 41/003* (2013.01);
(Continued)

(58) Field of Classification Search
CPC ................. F25D 11/003; F25D 17/042; F25D 2317/04111; F25D 2317/04313; Y02B 30/741; Y02B 40/32
See application file for complete search history.

(56) References Cited

U.S. PATENT DOCUMENTS

2004/0261436 A1    12/2004  Taras et al.
2010/0170271 A1*   7/2010   Lifson .................... F24F 3/153
                                                                62/84
(Continued)

FOREIGN PATENT DOCUMENTS

EP        2005-76933 A    3/2005
EP          1912029 A1    4/2008
(Continued)

*Primary Examiner* — Elizabeth Martin
(74) *Attorney, Agent, or Firm* — Birch, Stewart, Kolasch & Birch, LLP

(57) ABSTRACT

A container refrigeration device aims to improve dehumidification performance of the container refrigeration device. The container refrigeration device is configured to perform, in accordance with a dehumidification load, first dehumidification control under which air having passed through an evaporator is heated by exchanging heat with a refrigerant in a reheat heat exchanger, and blown into an inside of a container, and second dehumidification control under which a pressure of the refrigerant discharged from a compressor and flowing into the reheat heat exchanger is caused to be higher than a pressure of the refrigerant discharged from the compressor under the first dehumidification control, and a flow rate of the refrigerant discharged from the compressor is regulated such that a temperature inside the container is within a predetermined temperature range.

6 Claims, 8 Drawing Sheets

(51) Int. Cl.
*F25B 1/00* (2006.01)
*F25D 17/04* (2006.01)
*F25B 41/00* (2006.01)
*F25B 41/04* (2006.01)
*F25B 49/02* (2006.01)
*F25B 6/02* (2006.01)

(52) U.S. Cl.
CPC ............ *F25B 41/043* (2013.01); *F25B 49/02* (2013.01); *F25D 17/042* (2013.01); *F25B 6/02* (2013.01); *F25B 2400/13* (2013.01); *F25B 2600/0253* (2013.01); *F25B 2600/2515* (2013.01); *F25B 2700/1931* (2013.01); *F25B 2700/1933* (2013.01); *F25B 2700/2104* (2013.01); *F25B 2700/2106* (2013.01); *F25B 2700/21151* (2013.01); *F25B 2700/21152* (2013.01); *F25D 2317/04111* (2013.01); *Y02B 30/741* (2013.01); *Y02B 40/32* (2013.01)

(56) References Cited

U.S. PATENT DOCUMENTS

2012/0266621 A1\* 10/2012 Yokohara ............... F25B 47/022
62/155
2012/0272669 A1\* 11/2012 Blanton .................... F25B 5/02
62/89
2013/0014522 A1\* 1/2013 Lukasse ................ F25D 17/042
62/93

FOREIGN PATENT DOCUMENTS

| EP | 1923646 A1 | 5/2008 |
| JP | 9-189460 A | 7/1997 |
| JP | 11-63769 A | 3/1999 |
| JP | 2007-527308 A | 9/2007 |
| JP | 2010-156513 A | 7/2010 |

\* cited by examiner

FIG.5

COOLING OPERATION
INV: Inverter Frequency under Control (First Temperature Control)
MAIN EV: Main Expansion Valve under Control (First Temperature Control)
INTERMEDIATE EV: Intermediate Expansion Valve under Control
OUTER FAN: Outer Fan under Control
INNER FAN: High
RSV: Off
DMV: 760 pls

DEHUMIDIFYING OPERATION

FIRST DEHUMIDIFICATION CONTROL
INV: Inverter Frequency under Control (First Temperature Control)
    or Second Temperature Control _ during Dehumidifying
MAIN EV: Main Expansion Valve under Control(First Temperature Control)
    or Second Temperature Control _ during Dehumidifying
INTERMEDIATE EV: Off
OUTER FAN: Outer Fan under Control
INNER FAN: High
RSV: On
DMV: 760 pls

SECOND DEHUMIDIFICATION CONTROL
INV: Inverter Frequency under Control (First Temperature Control)
    or Second Temperature Control _ during Dehumidifying
MAIN EV: {Main Expansion Valve under Control + ($\alpha$ Control: $\alpha$ = Initial Value)}
    or Second Temperature Control _ during Dehumidifying
INTERMEDIATE EV: Off
OUTER FAN: $\beta$ Control
INNER FAN: High
RSV: On
DMV: 760 pls

THIRD DEHUMIDIFICATION CONTROL
INV: Inverter Frequency under Control (First Temperature Control)
    or Second Temperature Control _ during Dehumidifying
MAIN EV: {Main Expansion Valve under Control + ($\alpha$ Control)}
    or Suction Temperature Control _ during Dehumidifying
INTERMEDIATE EV: Off
OUTER FAN: $\beta$ Control: $\beta$ = $\beta$ max
INNER FAN: High
RSV: On
DMV: 760 pls

FIG.6

| | FIRST DEHUMIDIFICATION CONTROL | SECOND DEHUMIDIFICATION CONTROL | THIRD DEHUMIDIFICATION CONTROL |
|---|---|---|---|
| COMPRESSOR (INV) | Inverter Frequency under Control | Inverter Frequency under Control | PI Control |
| MAIN EV | Main Expansion Valve under Control (SH Control of Evaporator) | Main Expansion Valve under Control (SH Control of Evaporator) | Main Expansion Valve under Control Control of Superheat Degre $\alpha$ ($\alpha$ =1 to 12) |
| CF | Start/Stop High-pressure Control | Start/Stop $\beta$ Control($\beta$ =1 to 9) | Start/Stop $\beta$ Control($\beta$ =Max) |
| ESV | OFF | OFF | OFF |
| INTERMEDIATE EV | OFF | OFF | OFF |
| HSV | OFF | OFF | OFF |
| RSV | ON | ON | ON |
| DMV | 760pls | 760pls | 760pls |

REFRIGERATION DEVICE FOR CONTAINER

TECHNICAL FIELD

The present invention relates to a container refrigeration device (a refrigeration device for container), and in particular, to improvement of dehumidification performance.

BACKGROUND ART

Container refrigeration devices have conventionally been used to cool the inside of containers for use in, e.g., marine transportation. The container refrigeration device described in Patent Document 1 includes a refrigerant circuit including a compressor, a condenser, a receiver, an electronic expansion valve, and an evaporator which are sequentially connected together. The refrigerant circuit also includes a heat exchanger for heating (i.e., a reheat heat exchanger) which is located on the leeward side of the evaporator. This heat exchanger is configured to allow a gaseous refrigerant discharged by the compressor to flow therethrough. The container refrigeration device performs dehumidifying operation during which air having been cooled and dehumidified in the evaporator (i.e., blown air) is heated (i.e., reheated) by the reheat heat exchanger.

CITATION LIST

Patent Document

PATENT DOCUMENT 1: Japanese Unexamined Patent Publication No. H11-63769

SUMMARY OF THE INVENTION

Technical Problem

Recently, there have been many cases where precision machines or fresh foods are loaded in containers. Accordingly, there has been an increasing demand to improve dehumidification performance of container refrigeration devices. On the other hand, the dehumidification performed by the above-described reheat heat exchanger may disadvantageously provide insufficient dehumidification performance.

It is therefore an object of the present invention to improve dehumidification performance of a container refrigeration device.

Solution to the Problem

A first aspect of the present invention relates to a container refrigeration device comprising: a refrigerant circuit (20) including a compressor (30), a condenser (31), an expansion mechanism (32), and an evaporator (33) sequentially connected together; and a reheat heat exchanger (83) configure to allow part of a refrigerant discharged from the compressor (30) to directly flow into the reheat heat exchanger (83), the device configured to cool air sucked from an inside of a container (C) by causing the sucked air to exchange heat with the refrigerant flowing through the evaporator (33), wherein the device is further configured to perform, in accordance with a dehumidification load, first dehumidification control under which the air having passed through the evaporator (33) is heated by exchanging heat with the refrigerant in the reheat heat exchanger (83), and blown into the inside of the container (C), and second dehumidification control under which a pressure of the refrigerant discharged from the compressor (30) and flowing into the reheat heat exchanger (83) is caused to be higher than a pressure of the refrigerant discharged from the compressor (30) under the first dehumidification control, and a flow rate of the refrigerant discharged from the compressor (30) is regulated such that a temperature inside the container (C) is within a predetermined temperature range.

According to the first aspect, the first dehumidification control and the second dehumidification control are performed. Under the first dehumidification control, the refrigerant discharged from the compressor (30) circulates through the refrigerant circuit (20) and flows out of the expansion mechanism (32). In the evaporator (33), the refrigerant is cooled by exchanging heat with the air sucked from the inside of the container (C), and consequently, condensation occurs, thereby dehumidifying the inside of the container (C). Part of the refrigerant discharged from the compressor (30) flows directly into the reheat heat exchanger (83). In the reheat heat exchanger (83), the discharged refrigerant exchanges heat with the air having been subjected to cooling dehumidification in the evaporator (33) (i.e., the air having passed through the evaporator (33)), and the air having been subjected to cooling dehumidification is heated. That is, the air having passed through the evaporator (33) is heated in the reheat heat exchanger (83) whereas the cooling performance of the evaporator (33) is increased such that the temperature inside the container (C) is within the predetermined temperature range, thereby the air passing through the evaporator (33) is cooled and dehumidified. In this manner, the inside of the container (C) is dehumidified, and the temperature inside the container is maintained within the predetermined temperature range.

Under the second dehumidification control, the pressure of the refrigerant discharged from the compressor (30) is caused to be higher than the pressure of the refrigerant discharged from the compressor (30) under the first dehumidification control. In this manner, the pressure discharged from the compressor (30) and flowing into the reheat heat exchanger (83) is increased, and the heating performance of the reheat heat exchanger (83) is increased. Further, in order to cause the temperature inside the container (C) to be within the predetermined temperature range, the flow rate of the refrigerant discharged from the compressor (30) is increased, and the cooling performance of the evaporator (33) is increased. Thus, the cooling performance and the dehumidification performance of the evaporator (33) are increased.

A second aspect of the present invention relates to the container refrigeration device of the first aspect, wherein the device is configured to further perform third dehumidification control under which a superheat degree α of the refrigerant in the evaporator (33) is caused to be higher than a predetermined superheat degree, and the flow rate of the refrigerant discharged from the compressor (30) is regulated such that the temperature inside the container (C) is within the predetermined temperature range, and to perform the first dehumidification control, the second dehumidification control, and the third dehumidification control in accordance with the dehumidification load.

According to the second aspect, the third dehumidification control is performed. Under the third dehumidification control, the superheat degree α of the evaporator (33) is caused to be higher than the predetermined superheat degree. Consequently, the pressure of the suction side of the compressor (30) decreases, and the outlet evaporating temperature of the evaporator (33) decreases. This results in that an amount of moisture condensing in the evaporator (33) increases, and dehumidification performance increases. Since the increase of the superheat degree α of the evaporator (33) leads to an increase in a specific volume of the refrigerant flowing through the evaporator (33), the flow rate of the refrigerant flowing through the evaporator (33) decreases. Therefore, in accordance with the increase of the superheat degree α, the flow rate of the refrigerant discharged from the compressor (30) is increased, thereby increasing the flow rate of the refrigerant flowing through the evaporator (33). In this manner, the cooling performance of the evaporator (33) is maintained, and the temperature inside the container (C) can be maintained within the predetermined temperature range.

A third aspect of the present invention relates to the container refrigeration device of the first or second aspect, wherein a revolution speed N of the compressor (30) is variable, and the flow rate of the refrigerant discharged from the compressor (30) is regulated by regulating the revolution speed N of the compressor (30).

According to the third aspect, the flow rate of the refrigerant discharged from the compressor (30) is regulated by regulating the revolution speed N of the compressor (30), thereby regulating the flow rate of the refrigerant flowing through the evaporator (33).

A fourth aspect of the present invention related to the container refrigeration device of the first or second aspect, wherein the refrigerant circuit (20) is connected to a flow regulating valve (92) configured to regulate a flow rate of the refrigerant being sucked into the compressor (30), and the flow rate of the refrigerant discharged from the compressor (30) is regulated by opening or closing the flow regulating valve (92).

According to the fourth aspect, the flow rate of the refrigerant being sucked into the compressor (30) is regulated by opening or closing the flow regulating valve (92), thereby regulating the flow rate of the refrigerant discharged from the compressor (30) and the flow rate of the refrigerant flowing through the evaporator (33).

Advantages of the Invention

According to the first aspect, since the pressure of the refrigerant discharged from the compressor (30) is increased, the pressure of the refrigerant flowing through the reheat heat exchanger (83) can be increased. Consequently, the heating performance of the reheat heat exchanger (83) can be increased. On the other hand, since the flow rate of the refrigerant discharged from the compressor (30) is regulated such that the temperature inside the container (C) is within the predetermined temperature range, it is possible to increase the cooling performance of the evaporator (33) in accordance to the increase in the heating performance of the reheat heat exchanger (83). It is thus possible to increase the performance of dehumidifying the air passing through the evaporator (33) while maintaining the temperature inside the container (C) with in predetermined temperature range.

According to the second aspect, since the superheat degree α of the evaporator (33) is increased, the outlet evaporating temperature of the evaporator (33) can be reduced. Further, since the flow rate of the refrigerant discharged from the compressor (30) is regulated, the flow rate of the refrigerant of the evaporator (33) can be increased in accordance with the increase in the superheat degree α. In this manner, the amount of moisture condensing in the evaporator (33) increases, and the dehumidification performance can be increased. As a result, it is possible to increase the dehumidification performance of the evaporator (33) while maintaining the temperature inside the container (C) with in predetermined temperature range.

According to the third aspect, since the revolution speed N of the compressor (30) is variable, the flow rate of the refrigerant discharged from the compressor (30) can be regulated by changing the revolution speed N of the compressor (30), which enables regulation of the flow rate of the refrigerant flowing through the evaporator (33). It is thus possible to maintain the temperature inside the container (C) within the predetermined temperature range.

According the fourth aspect, since the flow regulating valve (92) configured to regulate the flow rate of the refrigerant being sucked into the compressor (30) is provided, it is possible to regulate the flow rate of the refrigerant discharged from the compressor (30) by opening or closing the flow regulating valve (92). Thus, the flow rate of the refrigerant flowing through the evaporator (33) can be regulated. In this manner, the temperature inside the container (C) can be maintained within the predetermined temperature range.

BRIEF DESCRIPTION OF THE DRAWINGS

FIG. 5 is a block diagram illustrating control performed during dehumidifying operation according to the first embodiment.

FIG. 6 is a table showing a dehumidification control state according to the first embodiment.

DESCRIPTION OF EMBODIMENTS

Embodiments of the present invention will be described below in detail with reference to the drawings.

First Embodiment of the Invention

Figure 1:
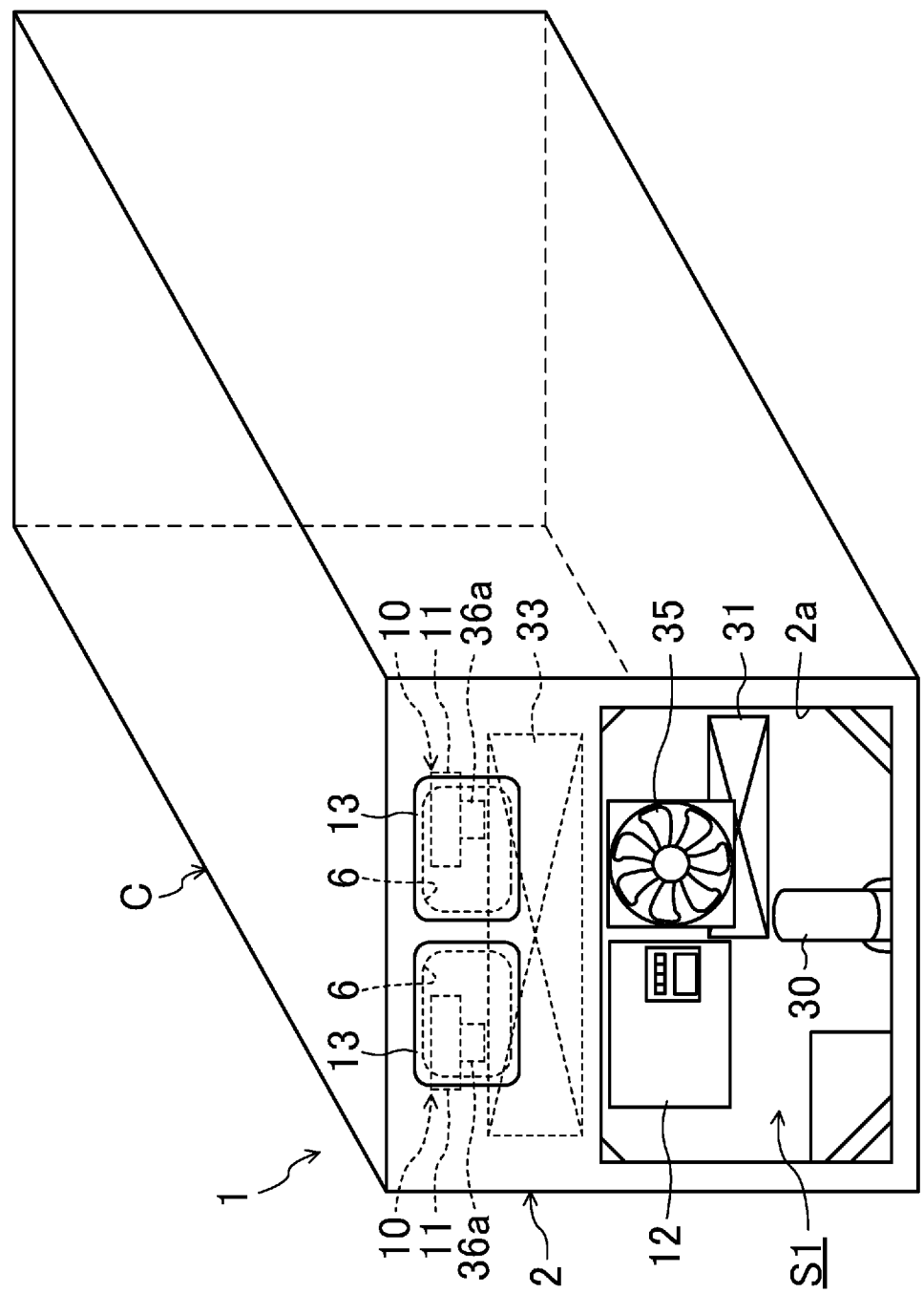
FIG. 1 is a perspective view of a container refrigeration device according to a first embodiment, as viewed from outside of the container.
Figure 2:
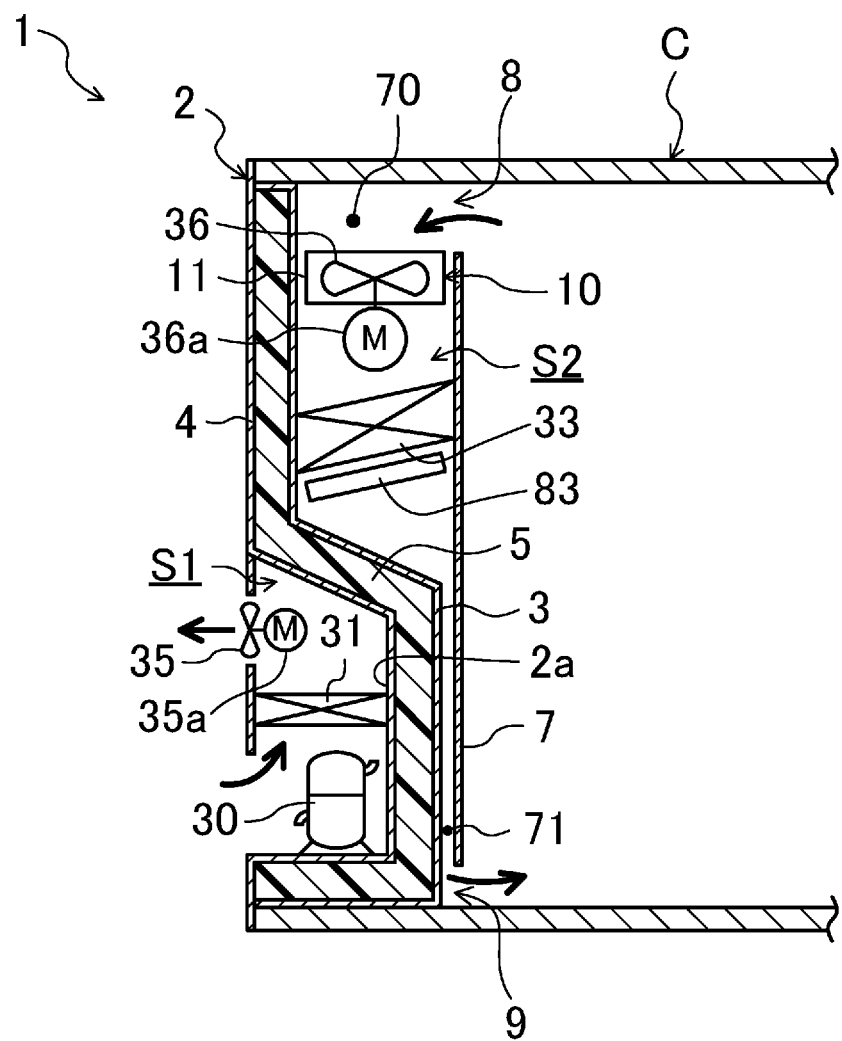
FIG. 2 is a cross-sectional view illustrating a configuration of the container refrigeration device of the first embodiment.
Figure 3:
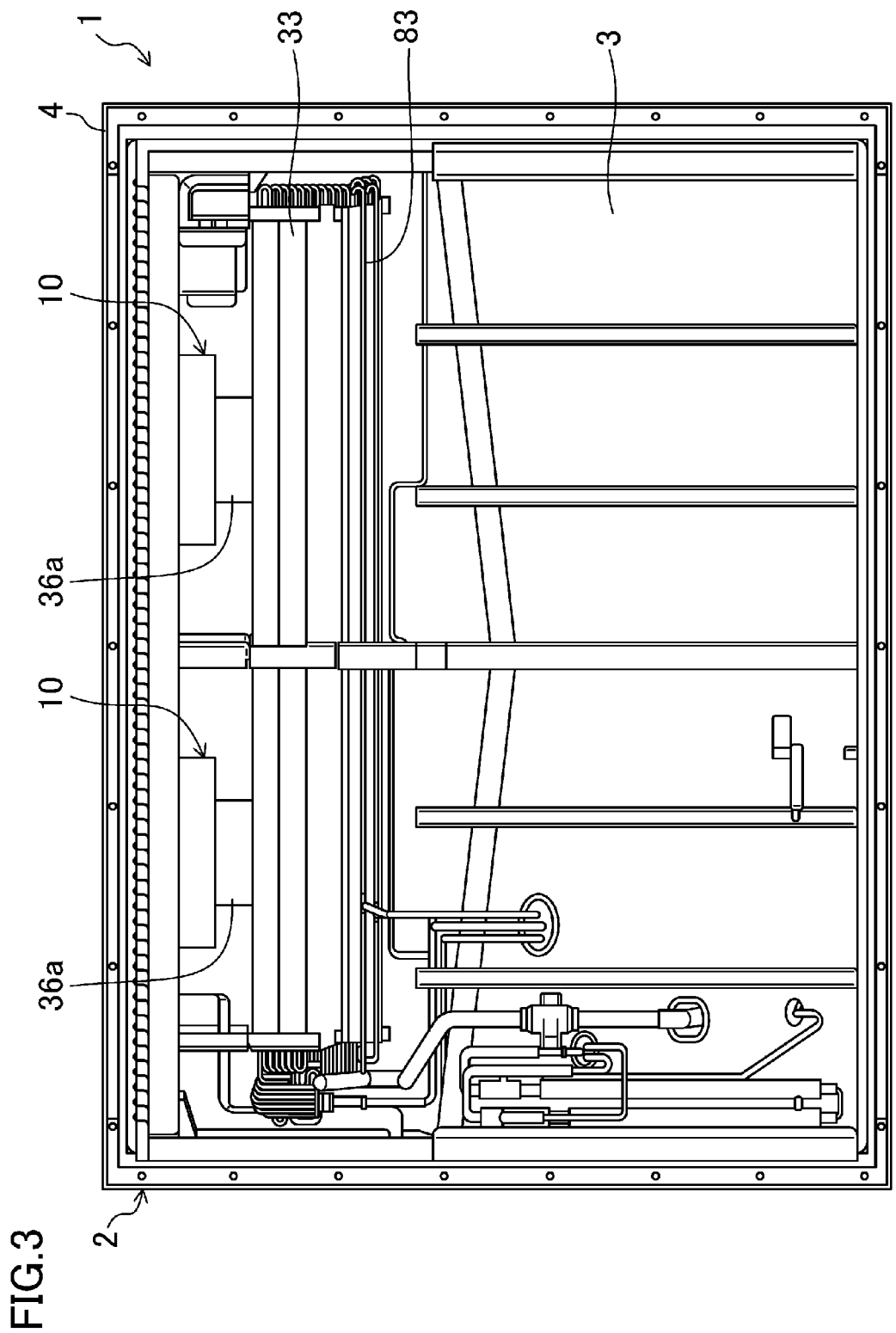
FIG. 3 is a front view of a casing of the first embodiment, as viewed from inside of the container.
Figure 4:
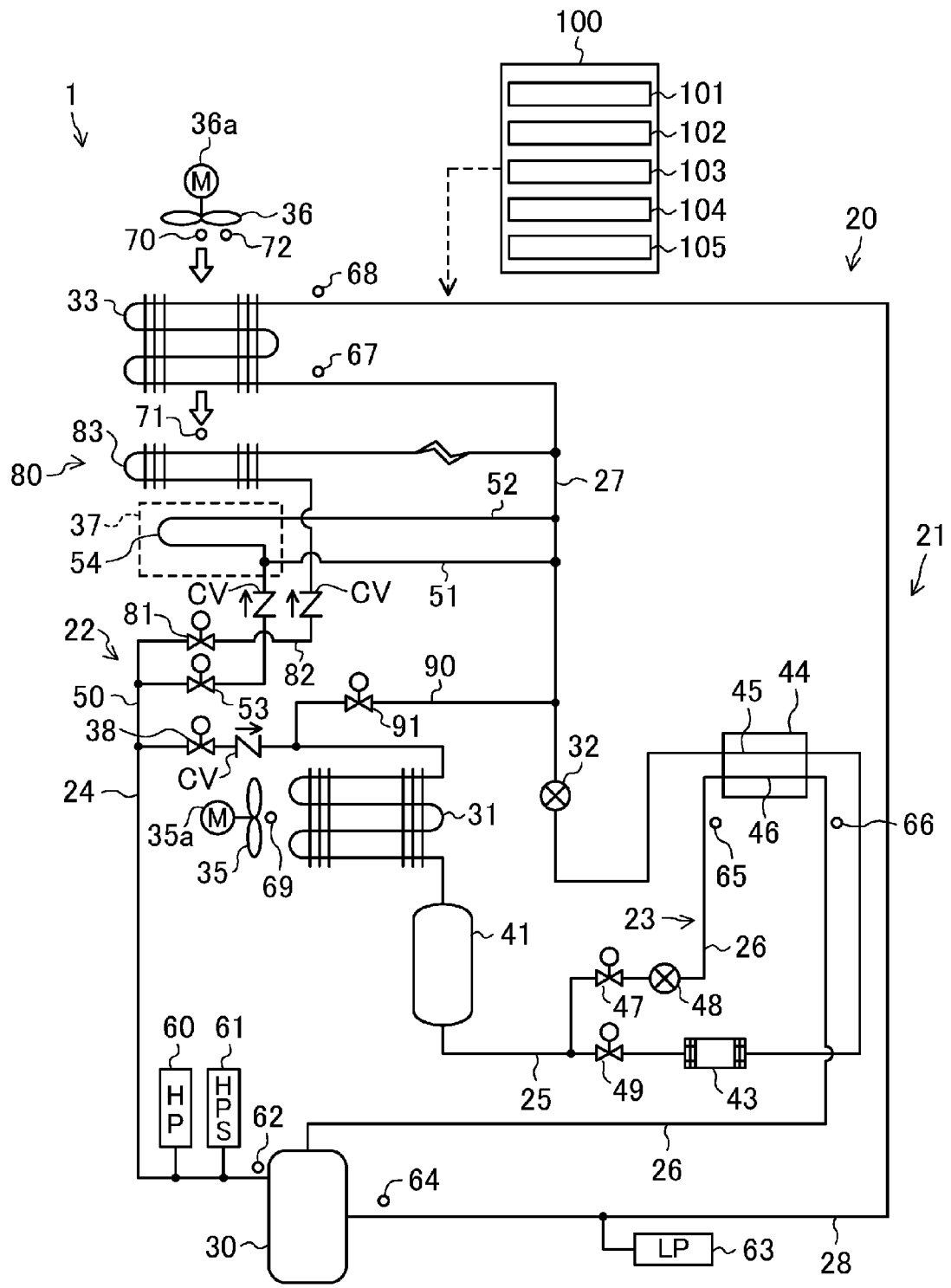
FIG. 4 is a piping system diagram illustrating a refrigerant circuit of the container refrigeration device of the first embodiment.

As illustrated in FIGS. 1-3, a container refrigeration device (1) of the first embodiment is configured to perform refrigeration or freezing in the inside of a container (C) for use in, e.g., marine or land transportation. The container refrigeration device (1) is provided to the box-shaped container (C) having a lateral open end in such a manner that the device closes the open end. The container refrigeration device (1) includes a refrigerant circuit (20), as illustrated in FIG. 4. Thus, the container refrigeration device (1) is configured to cool air inside the container (C) by utilizing a refrigeration cycle performed by the refrigerant circuit (20). Freight (not shown) to be cooled is loaded in the container (C).

—Configuration of Container Refrigeration Device—

As illustrated in FIGS. 1-3, the container refrigeration device (1) includes a casing (2). The peripheral edge portion of the casing (2) is attached to the container (C) to close the open end of the container (C).

As illustrated in FIG. 2, the casing (2) includes an outer casing (4) located toward the outside of the container (C) and an inner casing (3) located toward the inside of the container (C). The outer casing (4) and the inner casing (3) are made of an aluminum alloy.

The outer casing (4) is attached to the peripheral edge portion of the opening of the container (C) to close the open end. The outer casing (4) is in such a shape that a lower portion of the outer casing (4) protrudes toward the inside of the container (C).

The inner casing (3) faces the outer casing (4). A portion of the inner casing (3) corresponding to the lower portion of the outer casing (4) protrudes toward the inside of the container. An insulation material (5) is provided in the space between the outer casing (4) and the inner casing (3). As illustrated in FIG. 1, two openings (6) are located side by side in the width direction and near the upper edge of the casing (2). Each of the openings (6) is provided with a door (13) which can be opened or closed when maintenance is performed. The casing (2) has an outer storage space (S1), where an electric component box (12) is provided adjacent to an outer fan (35).

A lower portion of the casing (2) is shaped to protrude toward the inside of the container (C), thereby forming a recess (2a) in a portion of the lower portion of the casing (2) toward the outside of the container (C). The outer storage space (S1) is located in the portion of the lower portion of the casing (2) toward the outside of the container (C) whereas an inner storage space (S2) is located in a portion of an upper portion of the casing (2) toward the inside of the container (C).

A partition plate (7) is provided near a side of the casing (2) facing the inside of the container (C). The partition plate (7) which is a substantially rectangular plate is positioned upright and faces a surface of the casing (2) toward the inside of the container (C). The partition plate (7) separates the inner storage space (S2) from the inside of the container (C). A gap is provided between the upper edge of the partition plate (7) and the ceiling of the container (C). This gap forms an air inlet (8) through which inside air of the container (C) is sucked into the inner storage space (S2). Another gap is provided between the lower edge of the partition plate (7) and the inner bottom surface of the container (C). This gap forms an air outlet (9) through which air treated by the container refrigeration device (I) (i.e., inside air having been cooled) is blown out to the inside of the container (C).

In the outer storage space (S1), a compressor (30), a condenser (31), the outer fan (35), and an outer fan motor (35a) are provided. The compressor (30) and the condenser (31) are connected to the refrigerant circuit (20).

The outer fan motor (35a) rotates the outer fan (35), thereby introduce air outside the container (C) (i.e., outside air) into the outer storage space (S1) and sends the air to the condenser (31). In the condenser (31), a refrigerant flowing through the condenser (31) exchanges heat with the outside air.

In an upper portion of the inner storage space (S2), an evaporator (33), two blower units (10, 10), a suction air temperature sensor (70), and a reheat heat exchanger (83) are provided. In a lower portion of the inner storage space (S2), a blown air temperature sensor (71) is provided.

Specifically, the suction air temperature sensor (70) is positioned in a portion of the inner storage space (S2) located uppermost and near to the air inlet (8). Each blower unit (10) is located immediately below the suction air temperature sensor (70). The evaporator (33) is located immediately below the blower units (10). The reheat heat exchanger (83) is located immediately below the evaporator (33). The blown air temperature sensor (71) is positioned in a portion of the inner storage space (S2) located lowermost and nearest to the air outlet (9).

Each blower unit (10) is configured to suck inside air of the container (C) and to blow the air toward the evaporator (33). The two blower units (10, 10) are located side by side in the width direction of the casing (2) in the upper portion of the inner storage space (S2). Each blower unit (10) includes a fan housing (11), an inner fan (36), and an inner fan motor (36a). The inner fan motor (36a) rotates the inner fan (36), thereby introducing the inside air of the container (C) through the air inlet (8) and blowing the air toward the evaporator (33). In the evaporator (33), the refrigerant flowing through the evaporator (33) exchanges heat with the air sucked through the air inlet (8). The inside air having flowed out of the evaporator (33) passes through the reheat heat exchanger (83), and is blown into the inside of the container (C) through the air outlet (9).

The suction air temperature sensor (70) is configured to detect the temperature of air being sucked from the inside of the container (C) into the inner storage space (S2) (i.e., the inside air of the container). The suction air temperature sensor (70) is located between and above the two blower units (10, 10). A detection signal of the suction air temperature sensor (70) is sent to a controller (100) which will be described later.

The evaporator (33) is configured to cool the inside air of the container (C) having been sucked into the inner storage space (S2) by causing the inside air to exchange heat with the refrigerant. The evaporator (33) is connected to the refrigerant circuit (20), and configured to allow the refrigerant to flow therein. The refrigerant flowing through the evaporator (33) absorbs heat from the inside air of the container (C) sucked into the inner storage space (S2) and evaporates. The inside air of the container (C) sucked into the inner storage space (S2) dissipates heat and is cooled when passing through the evaporator (33). In particular, during dehumidifying operation, the evaporator (33) cools the inside air to cause moisture contained in the inside air to condense, and thereby dehumidifies the inside air (cooling dehumidification).

The reheat heat exchanger (83) is a heat exchanger which is used during the dehumidifying operation. Specifically, the reheat heat exchanger (83) is connected to the refrigerant circuit (20), and configured to heat the air subjected to the cooling dehumidification in the evaporator (33). During the dehumidifying operation of the container refrigeration device (1), discharged refrigerant having been compressed in the compressor (30) is directly supplied to the reheat heat exchanger (83). The air subjected to the cooling dehumidification in the evaporator (33) flows into the reheat heat exchanger (83). The air exchanges heat with the discharged refrigerant in the reheat heat exchanger (83). Thus, the air subjected to the cooling dehumidification in the evaporator (33) is heated.

The blown air temperature sensor (71) is configured to detect the temperature of air being blown from the inner storage space (S2) into the inside of the container (C). The blown air temperature sensor (71) is located in the lower portion of the inner storage space (S2). Specifically, the blown air temperature sensor (71) is located at a height between the protruding portion of the inner casing (3) and the partition plate (7) as well as substantially at the midpoint of the inside of the container (C) in the width direction.

—Configuration of Refrigerant Circuit—

As illustrated in FIG. 4, the refrigerant circuit (20) includes a main circuit (21), a hot gas bypass circuit (22), a reheat circuit (80), a subcooling circuit (23), and the controller (100).

The main circuit (21) includes the compressor (30), the condenser (31), a main expansion valve (32), and the evaporator (33) which are sequentially connected together via refrigerant pipes.

The compressor (30) has a motor (not shown) configured to drive a compression mechanism. The revolution speed of the motor of the compressor (30) is controlled in a stepwise manner by an inverter. Thus, the revolution speed N of the compressor (30) is variable.

Each of the condenser (31) and the evaporator (33) is a fin-and-tube heat exchanger. The condenser (31) is located in a portion of the casing (2) toward the outside of the container. In the condenser (31), the outside air exchanges heat with the refrigerant. The evaporator (33) is located in a portion of the casing (2) toward the inside of the container. In the evaporator (33), the inside air exchanges heat with the refrigerant. Further, a drain pan (37) is provided below the evaporator (33). The drain pan (37) is a flat container upwardly opening. The drain pan (37) collects therein frost and ice blocks having fallen from the evaporator (33), water condensed from air, etc. The opening degree of the main expansion valve (32) can be adjusted in a stepwise manner by a pulse motor. The main expansion valve (32) corresponds to the main EV shown in FIGS. 5 and 6. The outer fan (35) is located near the condenser (31) whereas the inner fan (36) is located near the evaporator (33). The inner fan (36) is configured to supply air cooled by the evaporator (33) to the inside of the container. The outer fan (35) and the inner fan (36) are provided with the outer fan motor (35a) and the inner fan motor (36a), respectively.

A fourth on-off valve (38) and a check valve (CV) are sequentially provided on a high-pressure gas pipe (24) located between the compressor (30) and the condenser (31). The opening degree of the fourth on-off valve (38) can be adjusted in a stepwise manner by a pulse motor. The fourth on-off valve (38) corresponds to the DMV shown in FIGS. 5 and 6. The check valve (CV) allows the refrigerant to flow in the direction indicated by the corresponding one of the arrows shown in FIG. 4, and prevents the refrigerant from flowing in the opposite direction.

A receiver (41), a second on-off valve (49), a dryer (43), and a subcooling heat exchanger (44) are sequentially provided on a high-pressure liquid pipe (25) located between the condenser (31) and the main expansion valve (32). The receiver (41) is located downstream of the flow of the refrigerant from the condenser (31), and configured to allow the refrigerant having flowed out of the condenser (31) to flow therein and separate the refrigerant into a saturated liquid and a saturated gas. The second on-off valve (49) is a solenoid valve which can be freely opened and closed. The dryer (43) is configured to capture moisture contained in the liquid refrigerant having flowed through the condenser (31). A liquid cogging prevention pipe (90) connects an upstream point of the condenser (31) to a downstream point of the main expansion valve (32). The liquid clogging prevention pipe (90) is provided with a liquid clogging on-off valve (91).

The subcooling heat exchanger (44) is configured to cool the liquid refrigerant having flowed through the condenser (31). The subcooling heat exchanger (44) includes a primary passage (45) and a secondary passage (46). Specifically, in the subcooling heat exchanger (44), the refrigerant flowing through the primary passage (45) exchanges heat with the refrigerant flowing through the secondary passage (46). The primary passage (45) is connected to the high-pressure liquid pipe (25) of the main circuit (21), and the secondary passage (46) is connected to a subcooling branch pipe (26) of the subcooling circuit (23). An inflow end of the subcooling branch pipe (26) is connected to a point of the high-pressure liquid pipe (25) between the receiver (41) and the second on-off valve (49). An outflow end of the subcooling branch pipe (26) is connected to a compression chamber (an intermediate pressure compression chamber) of the compressor (30) in which the refrigerant is being compressed (in an intermediate pressure state). In other words, the subcooling branch pipe (26) serves as a passage into which part of the liquid refrigerant in the high-pressure liquid pipe (25) is diverted to flow into the intermediate pressure compression chamber of the compressor (30). A first on-off valve (47) and a subcooling expansion valve (48) are provided on an inflow side of the secondary passage (46) of the subcooling branch pipe (26). The first on-off valve (47) is a solenoid valve which can be freely opened and closed. The subcooling expansion valve (48) of which the opening degree can be adjusted in a stepwise manner by a pulse motor forms a decompression mechanism for decompressing the refrigerant. The subcooling expansion valve (48) corresponds to the intermediate EV shown in FIGS. 5 and 6.

The hot gas bypass circuit (22) includes a main passage (50), and two branch passages (51, 52) branching off the main passage (50). The two branch passages (51, 52) are a first branch passage (51) and a second branch passage (52). An inflow end of the main passage (50) is connected to a point of the high-pressure gas pipe (24) between the fourth on-off valve (38) and the discharge side of the compressor (30). The main passage (50) is provided with a third on-off valve (53) and a check valve (CV). The third on-off valve (53) is a solenoid valve which can be freely opened and closed.

The first branch passage (51) has an end connected to an outflow end of the main passage (50) and the other end connected a low-pressure liquid pipe (27) located between the main expansion valve (32) and the evaporator (33). Likewise, the second branch passage (52) has an end connected to the outflow end of the main passage (50) and the other end connected to the low-pressure liquid pipe (27). The second branch passage (52) is a refrigerant pipe longer than the first branch passage (51). The second branch passage (52) includes a drain pan heater (54) which extends in a serpentine form along the bottom of the drain pan (37). The drain pan heater (54) is configured to heat the inside of the drain pan (37) with the refrigerant. Thus, the hot gas bypass circuit (22) constitutes a bypass circuit for supplying the refrigerant compressed by the compressor (30) (i.e., the high-temperature gaseous refrigerant discharged from the compressor (30)) to the evaporator (33).

The reheat circuit (80) includes a reheat passage (82). An inflow end of the reheat passage (82) is connected to the main passage (50). The reheat passage (82) is provided with a fifth on-off valve (81). The fifth on-off valve (81) is a solenoid valve which can be freely opened and closed. The fifth on-off valve (81) corresponds to the RSV shown in FIGS. 5 and 6. The reheat passage (82) includes the reheat heat exchanger (83) and a capillary tube. The reheat heat exchanger (83) is configured to heat, during the dehumidifying operation, air subjected to the cooling dehumidification in the evaporator (33) by causing the refrigerant discharged from the compressor (30) and having flowed into the reheat heat exchanger (83) to exchange heat with the air. The reheat heat exchanger (83) is a fin-and-tube heat exchanger. The capillary tube is configured to decompress the refrigerant having flowed out of the reheat heat exchanger (83). Thus, the reheat circuit (80) constitutes a circuit for supplying part of the refrigerant compressed by the compressor (30) (i.e., the high-temperature gaseous refrigerant discharged from the compressor (30)) to the reheat heat exchanger (83).

The refrigerant circuit (20) also includes various sensors. Specifically, the high-pressure gas pipe (24) is provided with a high pressure sensor (60), a high pressure switch (61), and a discharge temperature sensor (62). The high pressure sensor (60) detects the pressure of the high-pressure gaseous refrigerant discharged from the compressor (30). The discharge temperature sensor (62) detects a temperature of the high-pressure gaseous refrigerant discharged from the compressor (30). A low-pressure gas pipe (28) located between the evaporator (33) and the compressor (30) is provided with a low pressure sensor (63) and a suction temperature sensor (64). The low pressure sensor (63) detects the pressure of the low-pressure gaseous refrigerant being sucked into the compressor (30). The suction temperature sensor (64) detects the temperature of the low-pressure gaseous refrigerant being sucked into the compressor (30).

The subcooling branch pipe (26) is provided with an inflow temperature sensor (65) on the inflow side of the secondary passage (46) and an outflow temperature sensor (66) on the outflow side of the secondary passage (46). The inflow temperature sensor (65) detects the temperature of the refrigerant immediately before flowing into the secondary passage (46). The outflow temperature sensor (66) detects the temperature of the refrigerant immediately after flowing out of the secondary passage (46).

In the low-pressure liquid pipe (27), an inflow temperature sensor (67) is provided on the inflow side of the evaporator (33). The inflow temperature sensor (67) detects the temperature of the refrigerant immediately before flowing into the evaporator (33). In the low-pressure gas pipe (28), an outflow temperature sensor (68) is provided on the outflow side of the evaporator (33). The outflow temperature sensor (68) detects the temperature of the refrigerant immediately after flowing out of the evaporator (33).

Outside the container, an outside air temperature sensor (69) is provided on the suction side of the condenser (31). The outside air temperature sensor (69) detects the temperature of outside air immediately before being sucked into the condenser (31) (hereinafter referred to as the outside air temperature (Tout)). In the container, the suction air temperature sensor (70) and a humidity sensor (72) are provided on the suction side of the evaporator (33), and the blown air temperature sensor (71) is provided on the blowing-out side of the evaporator (33). The suction air temperature sensor (70) detects the temperature of the inside air immediately before entering the evaporator (33) (hereinafter referred to as the suction air temperature (Trs)). The humidity sensor (72) detects the humidity of the inside air immediately before entering the evaporator (33). The blown air temperature sensor (71) detects a temperature of the inside air of the container (C) immediately after passing through the evaporator (33) (hereinafter referred to as the blown air temperature (Tss)). In this embodiment, a humidity refers to a relative humidity.

The controller (100) includes a temperature controlling section (101), a control switching section (103), a temperature setting section (104), a dehumidification determining section (105), and a dehumidification controlling section (102). The controller (100) is connected to the foregoing sensors, and receives signals from the sensors.

The temperature controlling section (101) is configured to perform control during cooling operation or the dehumidifying operation such that the temperature inside the container (C) becomes equal to a predetermined target temperature. The control switching section (103) causes the temperature controlling section (101) to perform first temperature control and second temperature control in a switchable manner.

During the cooling or dehumidifying operation, under the first temperature control, temperature control is performed such that the blown air temperature (Tss) becomes equal to a first target temperature (Tsp). Specifically, under the first temperature control, the revolution speed N of the compressor (30) and/or the opening degree of the main expansion valve (32) are controlled to cause the blown air temperature (Tss) to approach the first target temperature (Tsp). More specifically, under the first temperature control, when the blown air temperature (Tss) is lower than the first target temperature (Tsp), the amount of the refrigerant circulating through the refrigerant circuit (20) is reduced by reducing the revolution speed N of the compressor (30) and/or the opening degree of the main expansion valve (32), thereby mildly cooling the inside air to cause the blown air temperature (Tss) to approach the first target temperature (Tsp). On the other hand, under the first temperature control, when the blown air temperature (Tss) is higher than the first target temperature (Tsp), the amount of the refrigerant circulating through the refrigerant circuit (20) is increased by increasing the revolution speed N of the compressor (30) and/or the opening degree of the main expansion valve (32), thereby further cooling the inside air to cause the blown air temperature (Tss) to approach the first target temperature (Tsp).

During the dehumidifying operation, under the second temperature control, temperature control is performed such that the suction air temperature (Trs) becomes equal to a second target temperature (Tsp') set by the temperature controlling section (104), which will be detailed later. Specifically, under the second temperature control, the revolution speed N of the compressor (30) and/or the opening degree of the main expansion valve (32) are controlled to cause the suction air temperature (Trs) to approach the second target temperature (Tsp'). More specifically, under the second temperature control, when the suction air temperature (Trs) is lower than the second target temperature (Tsp'), the amount of the refrigerant circulating through the refrigerant circuit (20) is reduced by reducing the revolution speed N of the compressor (30) and/or the opening degree of the main expansion valve (32), thereby mildly cooling the inside air to cause the suction air temperature (Trs) to approach the second target temperature (Tsp'). On the other hand, under the second temperature control, when the suction air temperature (Trs) is higher than the second target temperature (Tsp'), the amount of the refrigerant circulating through the refrigerant circuit (20) is increased by increasing the revolution speed N of the compressor (30) and/or the opening degree of the main expansion valve (32), thereby further cooling the inside air to cause the suction air temperature (Trs) to approach the second target temperature (Tsp').

Figure 7:
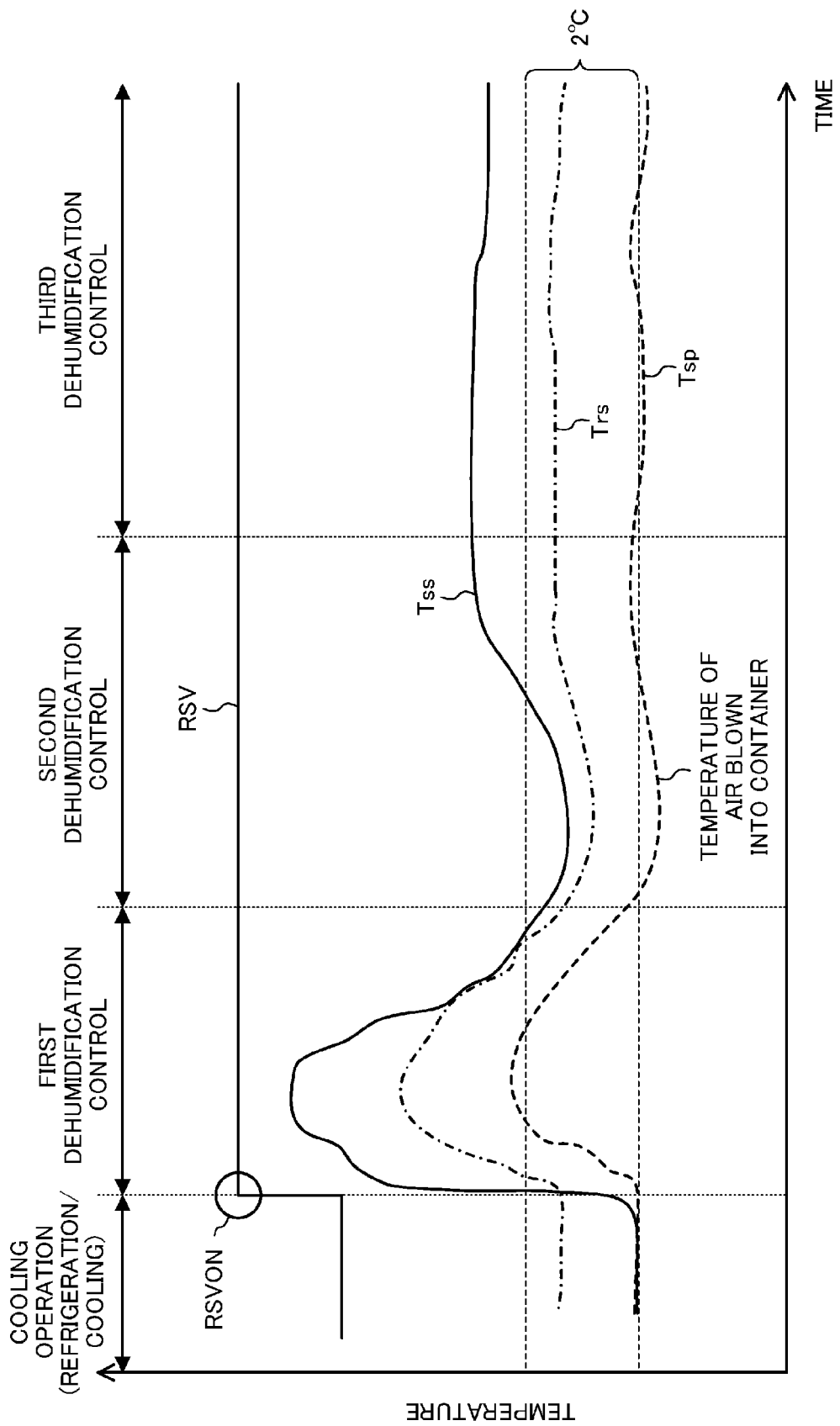
FIG. 7 is a graph illustrating a relation between time and temperature inside the container of the first embodiment.

The control switching section (103) is configured to perform switching from the first temperature control to the second temperature control when the blown air temperature (Tss) becomes higher than the suction air temperature (Trs) during the dehumidifying operation. During the dehumidifying operation, when air subjected to the cooling dehumidification in the evaporator (33) is heated by the reheat heat exchanger (83), the air blown into the inside of the container (C) may become non-uniform in temperature in the width direction of the container (C). This may result in that, as shown in FIG. 7, the blown air temperature (Tss) detected by the blown air temperature sensor (71) may be higher than the suction air temperature (Trs), depending on the location at which the blown air temperature sensor (71) is mounted. That is, it is possible that the blown air temperature sensor (71) detects (erroneously detects) the temperature of the blown air which has been locally increased due to influence of the reheat heat exchanger (83). On the other hand, the air being sucked from the inside of the container (C) into the evaporator (33) has been sufficiently agitated in the container (C), and consequently, temperature non-uniformity of the air is relatively lower than that of the blown air. Thus, it is less possible that a suction air temperature (Trs) which is locally high is detected. Therefore, during the dehumidifying operation, when the blown air temperature (Tss) becomes higher than the suction air temperature (Trs), the control switching section (103) switches the inside temperature control of the container (C) that the temperature control section (101) performs from the first temperature control to the second temperature control.

The temperature setting section (104) is configured to set a temperature in the container (C) under the second temperature control. Specifically, when the control switching section (103) switches the inside temperature control of the container (C) from the first temperature control to the second temperature control, the temperature setting section (104) sets a second target temperature (Tsp') by adding a fixed value of 2° C. as a correction value X to the first target temperature (Tsp) that is the target temperature in the inside of the container (C) under the first temperature control. Under the second temperature control, causing the suction air temperature (Trs) to approach the first target temperature (Tsp) may result in that the temperature inside the container (C) decreases excessively and low temperature damage occurs to the freight because the suction air temperature (Trs) is higher than the temperature inside the container (C) (i.e., the average temperature of the air blown into the container (C)). Therefore, under the second temperature control, the temperature setting section (104) sets the second target temperature (Tsp') by adding the fixed value of 2° C. as the correction value X to the first target temperature (Tsp) of the container (C). It is thus possible to prevent the temperature inside the container (C) from decreasing excessively and low temperature damage from occurring to the freight.

The dehumidification determining section (105) is configured to determine whether or not the dehumidifying operation of the inside of the container (C) is to be performed based on the temperature detected by the blown air temperature sensor (71) and the humidity detected by the humidity sensor (72) and a target humidity of the inside of the container (C). The dehumidification determining section (105) determines that the dehumidifying operation is to be performed when the temperature inside the container (C) is equal to or higher than 0° C. and is continuously within a predetermined range around the target temperature (Tsp, Tsp') and the humidity inside the container (C) is higher than the target humidity plus 2%. On the other hand, the dehumidification determining section (105) makes non-dehumidification determination not to perform the dehumidifying operation when the above conditions do not exist.

The dehumidification controlling section (102) is configured to control the dehumidifying operation of the inside of the container (C) when the dehumidification determining section (105) determines that the dehumidifying operation is to be performed. As shown in FIGS. 5 and 6, the dehumidification controlling section (102) sequentially performs first to third dehumidification control with increasing dehumidification load (i.e., with increasing difference between the humidity detected by the humidity sensor (72) and the target humidity of the inside of the container (C)).

The first dehumidification control is described first. Under the first dehumidification control, the fifth on-off valve (81) is fully opened and the refrigerant discharged from the compressor (30) is caused to flow into the reheat heat exchanger (83). Under the first dehumidification control, air subjected to the cooling dehumidification in the evaporator (33) exchanges heat with the refrigerant flowing through the reheat heat exchanger (83) when passing through the reheat heat exchanger (83), and consequently the air is heated. Thus, under the first dehumidification control, the air sucked from the inside of the container (C) is subjected to the cooling dehumidification in the evaporator (33), and heated in the reheat heat exchanger (83), thereby maintaining the inside temperature of the container (C) at the target temperature (Tsp, Tsp') while reducing the humidity of the inside air.

The second dehumidification control is performed when the inside of the container (C) remains insufficiently dehumidified after the dehumidification operation under the first dehumidification control has been performed. Under the second dehumidification control, β control by which the pressure of the refrigerant discharged from the compressor (30) and flowing into the reheat heat exchanger (83) (hereinafter referred to as the discharge pressure) becomes higher than the discharge pressure under the first dehumidification control is performed, thereby dehumidifying the inside of the container (C). Specifically, when the dehumidification determining section (105) determines that the dehumidifying operation is to be performed after the first dehumidification control, the discharge pressure of the compressor (30) is controlled according to the switching of the revolution speed of the outer fan (35) under the second dehumidification control. Note that the discharge pressure of the compressor (30) increases with increase of a variable value β (1 to 9) which is preset. In a state where the outer fan (35) is out of operation, since no heat exchange takes place in the condenser (31), the discharge pressure of the compressor (30) increases. When the discharge pressure has increased to reach the limit, the outer fan (35) is rotated. Accordingly, heat exchange takes place in the condenser (31), the discharge pressure of the compressor (30) decreases, and heating performance of the reheat heat exchanger (83) becomes insufficient. The dehumidification controlling section (102) then increases the variable value β in accordance with the dehumidification load, and thereby increases the target value of the discharge pressure of the compressor (30). At this time, since the outer fan (35) is rotating, heat exchange takes place in the condenser (31), and the cooling dehumidification performance of the evaporator (33) increases. In addition, in order to maintain the temperature inside the container (C), the target value of the discharge pressure of the compressor (30) is set higher than that in a case where the outer fan (35) is out of operation. A resultant increase in the pressure of the refrigerant flowing into the reheat heat exchanger (83) leads to an increase in the heating performance of the reheat heat exchanger (83). Note that the maximum pressure of the refrigerant discharged from the compressor (30) is 2100 kPa. That is, under the second dehumidification control, while the heating performance of the reheat heat exchanger (83) is increased, the cooling dehumidification performance of the evaporator (33) is increased. Consequently, the humidity inside the container can be reduced with the temperature inside the container (C) maintained at the target temperature (Tsp, Tsp').

The third dehumidification control is performed when the inside of the container (C) remains insufficiently dehumidified after the dehumidification operation under the first and second dehumidification control has been performed. Under the third dehumidification control, the inside of the container (C) is dehumidified by increasing a superheat degree $\alpha$ of the evaporator (33). Specifically, when the dehumidification determining section (105) determines that the dehumidifying operation is to be performed after the second dehumidification control, the third dehumidification control is performed in such a manner that the main expansion valve (32) is adjusted with the fifth on-off valve (81) fully opened to increase the superheat degree $\alpha$ of the evaporator (33) from 2° C. sequentially to 5° C., 8° C., 11° C., and 14° C. such that the humidity inside the container (C) approaches the target humidity. Note that the discharge pressure of the compressor (30) is set to the maximum value. Thus, since the suction pressure of the compressor (30) decreases and the specific volume of the refrigerant flowing through the evaporator (33) increases, the amount of the circulating refrigerant decreases. Further, the decrease in the suction pressure of the compressor (30) leads to a decrease in an outlet evaporating temperature of the evaporator (33) and an increase in an amount of moisture condensing in the evaporator (33). This prevents the inside temperature of the container (C) from being maintained at the target temperature (Tsp, Tsp'). Accordingly, the dehumidification controlling section (102) increases the revolution speed N of the compressor (30) to increase the amount of the refrigerant circulating through the refrigerant circuit (20). Thus, the amount of the refrigerant caused to flow into the evaporator (33) increases, and the cooling performance of the evaporator (33) increases. Consequently, the temperature inside the container (C) can be maintained at the target temperature (Tsp, Tsp').

—Operation—

Next, how the container refrigeration device (1) operates is described. The operation of the container refrigeration device (1) is roughly classified into the "cooling operation" and the "dehumidifying operation." The cooling operation is performed to cool the inside of the container (C) to a relatively low temperature. That is, the cooling operation is to cool the inside of the container (C) to refrigerate/cool the freight (e.g., fresh foods) housed in the container so as to preserve the freight. The dehumidifying operation is to reduce the humidity of the inside of the container (C).

<Cooling Operation>

During the cooling operation, "cooling" is implemented. Referring to FIG. 4, in the cooling of the cooling operation, the first on-off valve (47) and the second on-off valve (49) are in an open state, and the third on-off valve (53) and the fifth on-off valve (81) are in a closed state. The fourth on-off valve (38) is in a fully opened state, and the opening degrees of the subcooling expansion valve (48) and the main expansion valve (32) are adjusted appropriately. The compressor (30), the outer fan (35), and the inner fan (36) are in operation.

The refrigerant compressed in the compressor (30) condenses in the condenser (31), and then, passes through the receiver (41). Part of the refrigerant having passed through the receiver (41) continuously flows through the low-pressure liquid pipe (27) and the remainder diverts into the subcooling branch pipe (26). The refrigerant having flowed through the low-pressure liquid pipe (27) is decompressed in the main expansion valve (32), and thereafter, flows through the evaporator (33). In the evaporator (33), the refrigerant absorbs heat from the inside air and evaporates. Thus, the inside air is cooled. The refrigerant having evaporated in the evaporator (33) is sucked into the compressor (30) and compressed again.

The refrigerant having diverted into the subcooling branch pipe (26) passes through the subcooling expansion valve (48), and is decompressed to an intermediate pressure. Thereafter, the refrigerant flows through the secondary passage (46) of the subcooling heat exchanger (44), where the refrigerant flowing through the primary passage (45) exchanges heat with the refrigerant flowing through the secondary passage (46). Consequently, the refrigerant in the primary passage (45) is subcooled whereas the refrigerant in the secondary passage (46) evaporates. The refrigerant having flowed out of the secondary passage (46) is sucked through an intermediate port of the compressor (30) into the compression chamber at an intermediate pressure.

In the cooling, the temperature controlling section (101) controls the revolution speed N of the compressor (30) and the opening degree of the main expansion valve (32) such that the temperature inside the container (C) becomes equal to the first target temperature (Tsp). Specifically, when the blown air temperature (Tss) is lower than the first target temperature (Tsp), the temperature controlling section (101) reduces the revolution speed N of the compressor (30) and the opening degree of the main expansion valve (32). Thus, the amount of the refrigerant circulating through the refrigerant circuit (20) decreases to reduce the cooling performance, thereby causing the blown air temperature (Tss) to approach the first target temperature (Tsp). In this manner, the temperature inside the container (C) is maintained at the first target temperature (Tsp). On the other hand, when the blown air temperature (Tss) is higher than the first target temperature (Tsp), the temperature controlling section (101) increases the revolution speed N of the compressor (30) and the opening degree of the main expansion valve (32). Thus, the amount of the refrigerant circulating through the refrigerant circuit (20) increases to increase the cooling performance, thereby causing the blown air temperature (Tss) to approach the first target temperature (Tsp). In this manner, the temperature inside the container (C) is maintained at the first target temperature (Tsp).

In the cooling, the inner fan (36) is operated in a high state. Regarding the outer fan (35), the revolution speed of the outer fan motor (35a) is controlled in accordance with a state of the refrigerant discharged from the compressor (30).

<Dehumidifying Operation>

Next, the dehumidifying operation of the container refrigeration device (1) is described. The dehumidification controlling section (102) performs the dehumidifying operation based on the determination of the dehumidification determining section (105) that the dehumidifying operation is to be performed. During the dehumidifying operation, the three types of dehumidification control are performed in accordance with the dehumidification load. Further, during the dehumidifying operation, when the blown air temperature (Tss) becomes higher than the suction air temperature (Trs), the control switching section (103) switches the inside temperature control of the container (C) that the temperature controlling section (101) performs from the first temperature control to the second temperature control.

—First Dehumidification Control—

The first dehumidification control is described next. Under the first dehumidification control, as shown in FIGS. 4-6, the dehumidification controlling section (102) operates the compressor (30), the outer fan (35), and the inner fan (36), while bringing the fifth on-off valve (81) into the fully opened state. The first on-off valve (47) and the subcooling expansion valve (48) are in the closed state, and the fourth on-off valve (38) is opened at a degree of 760 pulses. The inner fan (36) is operated to rotate in the high state.

When the first dehumidification control is started, the refrigerant discharged from the compressor (30) passes through the fourth on-off valve (38), the condenser (31), and the main expansion valve (32) to flow into the evaporator (33). When passing through the inside of the evaporator (33), the refrigerant exchanges heat with the inside air sent by the inner fan (36). Consequently, the refrigerant absorbs heat from the inside air and evaporates, and the inside air is thus cooled to a temperature equal to or lower than the target temperature (Tsp, Tsp'), thereby causing moisture contained in the inside air to condense. Thus, the inside air is dehumidified.

Part of the refrigerant discharged from the compressor (30) passes through the fifth on-off valve (81) that is in the fully opened state, and flows into the reheat circuit (80). The discharged refrigerant having entered the reheat circuit (80) passes through the reheat passage (82) to enter the reheat heat exchanger (83). In the reheat heat exchanger (83), the refrigerant exchanges heat with the air subjected to the cooling dehumidification in the evaporator (33). Consequently, in the reheat heat exchanger (83), the refrigerant dissipates heat to the inside air and condenses, and the inside air is thus heated. That is, the air subjected to the cooling dehumidification in the evaporator (33) is heated in the reheat heat exchanger (83), thereby maintaining the inside temperature of the container (C) at the target temperature (Tsp, Tsp').

When the humidity inside the container (C) is still higher than the target humidity plus 2% and the inside temperature of the container (C) is continuously within the predetermined range around the target temperature (Tsp, Tsp') even after the first dehumidification control has been performed, the dehumidification determination section (105) makes determination to perform the dehumidifying operation, and the dehumidification controlling section (102) starts the second dehumidification control.

—Second Dehumidification Control—

Next, the second dehumidification control is descried with reference to FIGS. 4-6. The second dehumidification control is different from the first dehumidification control in that under the second dehumidification control, the outer fan (35) is subjected to the β control to increase the discharge pressure of the compressor (30). Under the second dehumidification control, the superheat degree α of the evaporator (33) is set to the initial value.

Specifically, when the second dehumidification control is started, the dehumidification controlling section (102) controls and sets the superheat degree α of the evaporator (33) to 2° C. The dehumidification controlling section (102) also stops the outer fan (35). When the outer fan (35) is stopped, no heat exchange takes place in the condenser (31), and accordingly, the discharge pressure of the compressor (30) increases. When the discharge pressure reaches the limit, the dehumidification controlling section (102) rotates the outer fan (35). Thus, heat exchange takes place in the condenser (31), the discharge pressure of the compressor (30) decreases, and the heating performance of the reheat heat exchanger (83) becomes insufficient. The dehumidification controlling section (102) then increases the variable value β from 1 to 9 in accordance with the dehumidification load, and thereby increases the target value of the discharge pressure of the compressor (30). Consequently, the pressure of the refrigerant flowing into the reheat heat exchanger (83) increases. This increases in the pressure of the refrigerant in the reheat heat exchanger (83) leads to an increase in the heating performance of the reheat heat exchanger (83). This increase in the heating performance of the reheat heat exchanger (83) leads to an increase in the temperature inside the container (C). Consequently, the dehumidification controlling section (102) increases the revolution speed N of the compressor (30) to increase the amount of the refrigerant circulating through the refrigerant circuit (20), and thereby increases cooling performance of the evaporator (33) and the amount of moisture condensing in the evaporator (33). In this manner, the humidity inside the container can be reduced with the temperature inside the container (C) maintained at the target temperature (Tsp, Tsp').

When the humidity inside the container (C) is still higher than the target humidity plus 2% and the temperature inside the container (C) is continuously within the predetermined range around the target temperature (Tsp, Tsp') even after the second dehumidification control has been performed, the dehumidification determination section (105) makes determination to perform the dehumidifying operation, and the dehumidification controlling section (102) starts the third dehumidification control.

—Third Dehumidification Control—

Next, the third dehumidification control is descried with reference to FIGS. 4-6. The third dehumidification control is different from the second dehumidification control in that under the third dehumidification control, the dehumidification controlling section (102) controls the superheat degree α of the evaporator (33).

Specifically, the dehumidification controlling section (102) adjusts the main expansion valve (32) to increase the superheat degree α of the evaporator (33) from 2° C. sequentially to 5° C., 8° C., 11° C., and 14° C. such that the humidity inside the container (C) approaches the target humidity. This results in that the suction pressure of the compressor (30) decreases and the specific volume of the refrigerant flowing through the evaporator (33) increases, and consequently, the amount of the circulating refrigerant decreases. Further, the decrease in the suction pressure of the compressor (30) leads to a decrease in the outlet evaporating temperature of the evaporator (33) and an increase in the amount of moisture condensing in the evaporator (33). Accordingly, the dehumidification controlling section (102) increases the revolution speed N of the compressor (30) to a value higher than a control value to increase the amount of the refrigerant circulating through the refrigerant circuit (20) and the amount of the refrigerant flowing into the evaporator (33). Consequently, the amount of the refrigerant flowing through the evaporator (33) increases, and the cooling performance of the evaporator (33) increases, and the temperature inside the container (C) is caused to approach the target temperature (Tsp, Tsp'). That is, it is possible to increase the dehumidification performance while maintaining the temperature inside the container (C) within the predetermined range around the target temperature (Tsp, Tsp').

—Switching of Inside Temperature Control—

Next, switching between the first temperature control and the second temperature control of the temperature controlling section (101) during the dehumidification operation is described. During the dehumidification operation, when the blown air temperature (Tss) becomes higher than the suction air temperature (Trs), the control switching section (103) causes the temperature controlling section (101) to switch the control of the temperature inside the container (C), from the first temperature control to the second temperature control.

Next, the temperature setting section (104) sets a target value of the temperature inside the container (C) under the second temperature control to the second target temperature (Tsp') obtained by adding the fixed value of 2° C. to the first target temperature (Tsp).

The temperature controlling section (101) then implements the second temperature control. The temperature controlling section (101) controls the revolution speed N of the compressor (30) and/or the opening degree of the main expansion valve (32) such that the suction air temperature (Trs) approaches the second target temperature (Tsp'). When the suction air temperature (Trs) is lower than the second target temperature (Tsp'), the temperature controlling section (101) reduces the revolution speed N of the compressor (30) and/or the opening degree of the main expansion valve (32) to reduce the amount of the refrigerant circulating through the refrigerant circuit (20), thereby mildly cooling the inside air and causing the suction air temperature (Trs) to approach the second target temperature (Tsp'). On the other hand, when the suction air temperature (Trs) is higher than the second target temperature (Tsp'), the temperature controlling section (101) increases the revolution speed N of the compressor (30) and/or the opening degree of the main expansion valve (32) to increase the amount of the refrigerant circulating through the refrigerant circuit (20), thereby further cooling the inside air and causing the suction air temperature (Trs) to approach the second target temperature (Tsp').

Advantages of First Embodiment

According to the first embodiment described above, since the pressure of the refrigerant discharged from the compressor (30) is increased, the pressure of the refrigerant flowing through the reheat heat exchanger (83) can be increased. Consequently, the heating performance of the reheat heat exchanger (83) can be increased. On the other hand, since the flow rate of the refrigerant discharged from the compressor (30) is regulated such that the temperature inside the container (C) is within the predetermined temperature range, it is possible to increase the cooling performance of the evaporator (33) in accordance to the increase in the heating performance of the reheat heat exchanger (83). It is thus possible to increase the performance of dehumidifying the air passing through the evaporator (33) while maintaining the temperature inside the container (C) within predetermined temperature range.

In addition, since the superheat degree α of the evaporator (33) is increased, the outlet evaporating temperature of the evaporator (33) can be reduced. Further, since the flow rate of the refrigerant discharged from the compressor (30) is regulated, the flow rate of the refrigerant through the evaporator (33) can be increased in accordance with the increase of the superheat degree α. In this manner, the amount of moisture condensing in the evaporator (33) increases, and the dehumidification performance can be thus increased. As a result, it is possible to increase the dehumidification performance of the evaporator (33) while maintaining the temperature inside the container (C) within predetermined temperature range.

Further, since the revolution speed N of the compressor (30) is variable, the flow rate of the refrigerant discharged from the compressor (30) can be regulated by changing the revolution speed N of the compressor (30), which enables regulation of the flow rate of the refrigerant flowing through the evaporator (33). It is thus possible to maintain the temperature inside the container (C) within the predetermined temperature range.

Second Embodiment of the Invention

Figure 8:
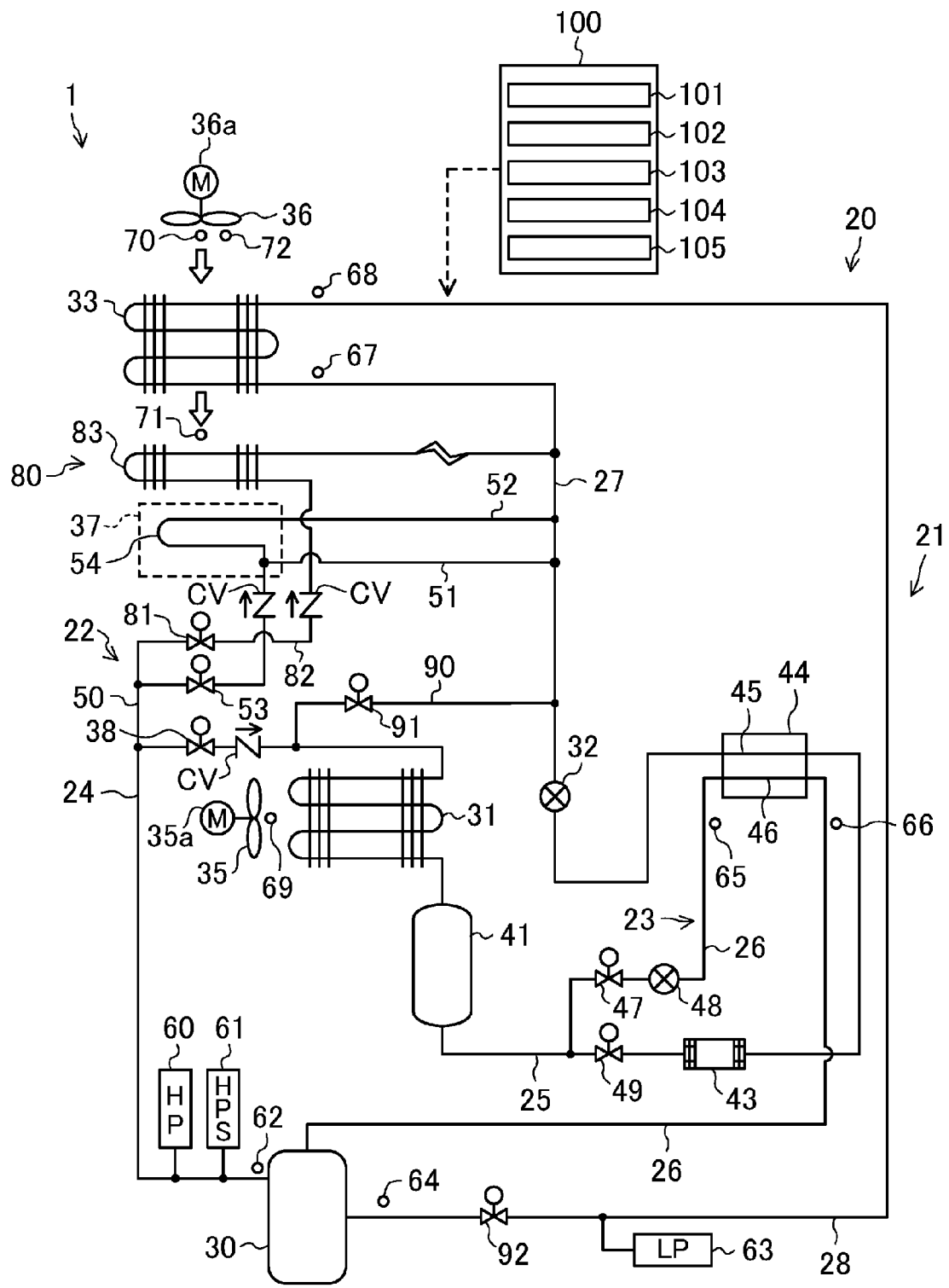
FIG. 8 is a piping system diagram illustrating a refrigerant circuit of a container refrigeration device according to a second embodiment.

A second embodiment is described next. As illustrated in FIG. 8, a container refrigeration device (1) according to the second embodiment is different from that of the first embodiment in that the device of the second embodiment includes a suction flow regulating valve (92) and a compressor (30) configured differently from that of the first embodiment. In the description of the second embodiment, only the differences between the first and second embodiments will be described.

Specifically, the compressor (30) of the second embodiment whose revolution speed is not variable operates at a fixed revolution speed. The suction flow regulating valve (92) is located in the refrigerant circuit (20), between the compressor (30) and the evaporator (33). The suction flow regulating valve (92) forms a flow regulating valve of the present invention. The temperature controlling section (101) regulates the opening degree of the suction flow regulating valve (92) to regulate the flow rate of the refrigerant being sucked into the compressor (30).

According to the second embodiment, since the suction flow regulating valve (92) configured to regulate the flow rate of the refrigerant being sucked into the compressor (30) is provided, it is possible to regulate the flow rate of the refrigerant discharged from the compressor (30) by opening or closing the suction flow regulating valve (92). Thus, the flow rate of the refrigerant flowing through the evaporator (33) can be regulated. In this manner, the temperature inside the container (C) can be maintained within a predetermined temperature range. The other configurations, operation, and advantages of this embodiment are similar to those of the first embodiment.

The foregoing embodiments are merely preferred examples in nature, and are not intended to limit the scope, applications, and use of the disclosure.

INDUSTRIAL APPLICABILITY

As described above, the present invention is useful for control of dehumidification performed by a container refrigeration device.

DESCRIPTION OF REFERENCE CHARACTERS

20 Refrigerant Circuit
30 Compressor
31 Condenser
32 Main Expansion Valve
33 Evaporator
83 Reheat Heat Exchanger
92 Suction Flow Regulating Valve

The invention claimed is:

1. A container refrigeration device comprising:
a refrigerant circuit including a compressor, a condenser, an expansion mechanism, and an evaporator sequentially connected together;
a reheat circuit including a reheat heat exchanger and configured to allow part of a refrigerant discharged from the compressor to directly flow into the reheat heat exchanger;
an outer fan, the device configured to cool air sucked from an inside of a container by causing the sucked air to exchange heat with the refrigerant flowing through the evaporator; and
a controller configured to control dehumidifying operation of air inside the container by performing, in accordance with a dehumidification load,
a first dehumidification control under which the air having passed through the evaporator is heated by exchanging heat with the refrigerant in the reheat heat exchanger, and blown into the inside of the container, and
a second dehumidification control which increases a cooling dehumidification performance of the evaporator by controlling a pressure of the refrigerant discharged from the compressor and flowing into the reheat heat exchanger to be higher than a pressure of the refrigerant discharged from the compressor under the first dehumidification control, and regulating a flow rate of the refrigerant discharged from the compressor such that a temperature inside the container is within a predetermined temperature range,
wherein the pressure of the discharged refrigerant is controlled according to a switching of a revolution speed of the outer fan under the second dehumidification control.

2. The container refrigeration device of claim 1, wherein the device is configured
to further perform third dehumidification control under which a superheat degree $\alpha$ of the refrigerant in the evaporator is caused to be higher than a predetermined superheat degree, and the flow rate of the refrigerant discharged from the compressor is regulated such that the temperature inside the container is within the predetermined temperature range, and
to perform the first dehumidification control, the second dehumidification control, and the third dehumidification control in accordance with the dehumidification load.

3. The container refrigeration device of claim 2, wherein a revolution speed N of the compressor is variable, and
the flow rate of the refrigerant discharged from the compressor is regulated by regulating the revolution speed N of the compressor.

4. The container refrigeration device of claim 2, wherein the refrigerant circuit is connected to a flow regulating valve configured to regulate a flow rate of the refrigerant being sucked into the compressor, and
the flow rate of the refrigerant discharged from the compressor is regulated by opening or closing the flow regulating valve.

5. The container refrigeration device of claim 1, wherein a revolution speed N of the compressor is variable, and
the flow rate of the refrigerant discharged from the compressor is regulated by regulating the revolution speed N of the compressor.

6. The container refrigeration device of claim 1, wherein the refrigerant circuit is connected to a flow regulating valve configured to regulate a flow rate of the refrigerant being sucked into the compressor, and
the flow rate of the refrigerant discharged from the compressor is regulated by opening or closing the flow regulating valve.

* * * * *